United States Patent Office 3,074,745
Patented Jan. 22, 1963

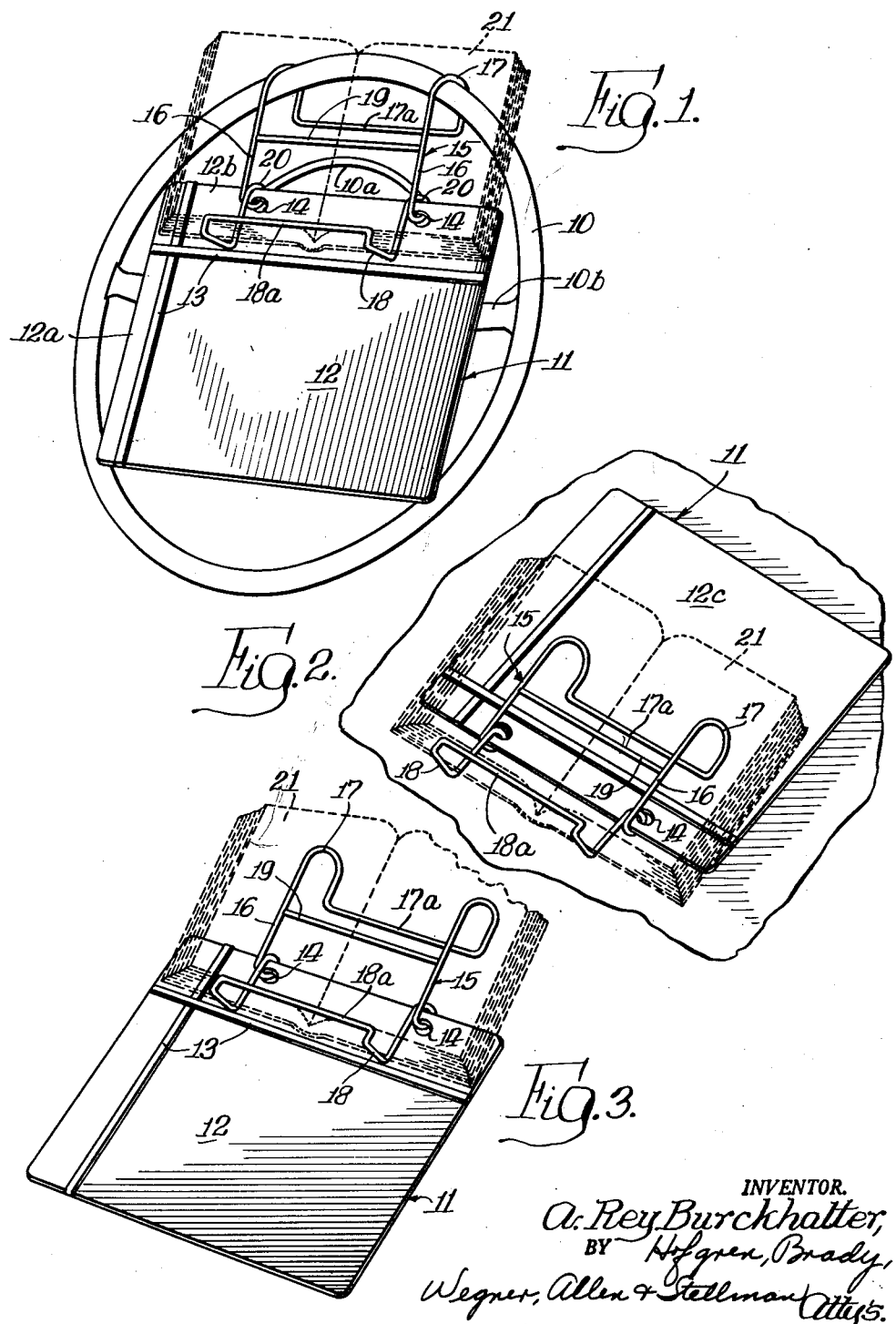

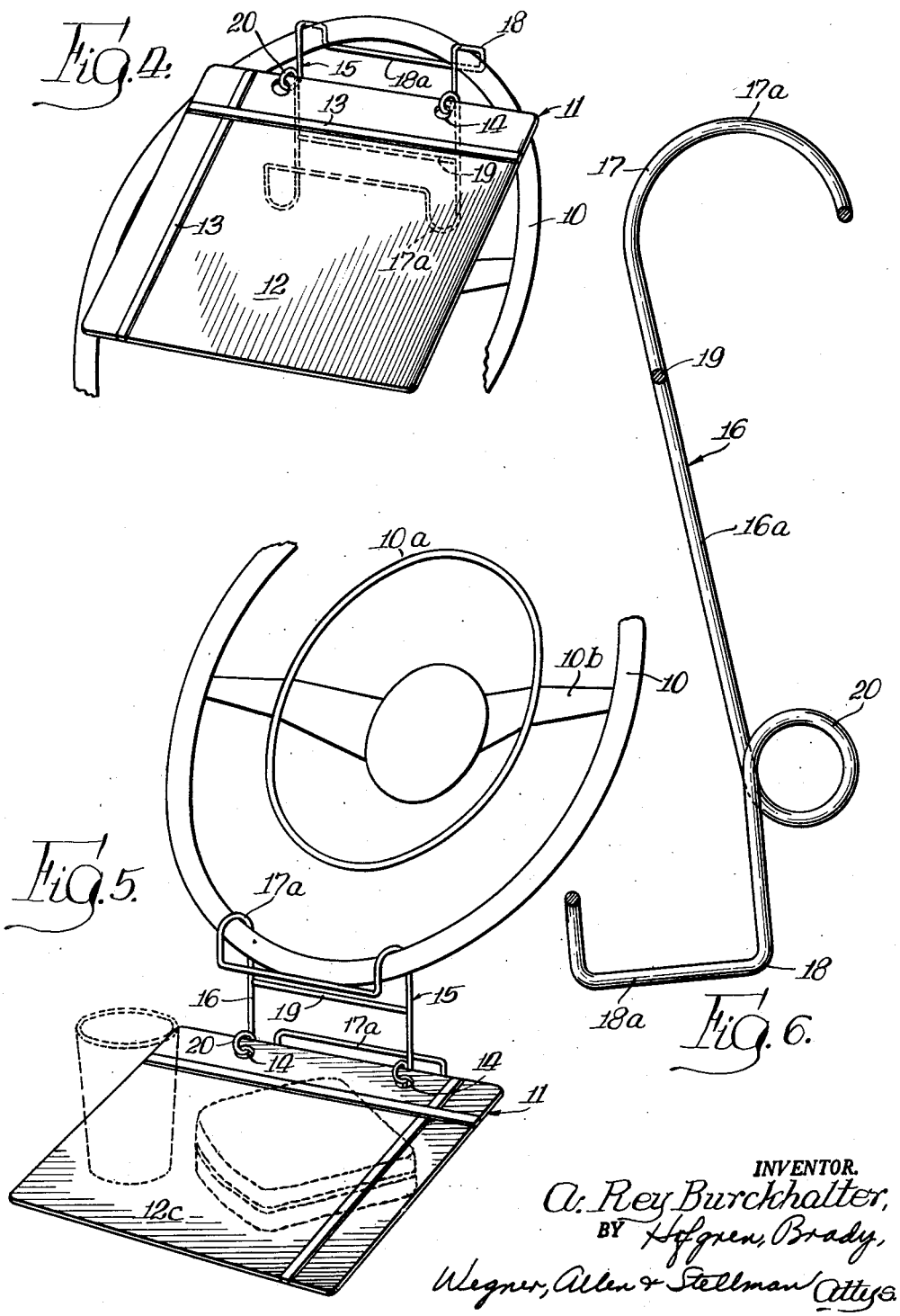

3,074,745
PORTABLE DESK
A. Rey Burckhalter, 167 E. Park Ave., Lake Forest, Ill.
Filed Jan. 25, 1960, Ser. No. 4,242
3 Claims. (Cl. 281—44)

This invention relates to a portable desk, and more particlarly to a portable desk which is adapted to be used in connection with a steering wheel.

Since so many business people and students use automobiles to provide transportation, it is often desirable to have a simple and convenient means of providing a book holder and/or writing surface or the like, in an automobile. People who do a lot of reading and/or writing while occupying a prone position also find it desirable to have a device which allows them to read and/or write while lying on the floor or on the beach, or the like.

It is therefore an object of this invention to provide a portable desk which is adapted to be used for supporting a book or the like, and for writing or the like.

It is another object of this invention to provide a portable desk which is adapted to be used in connection with a steering wheel for providing a book support and a writing support.

It is still another object of this invention to provide a portable desk which is designed to be used while the user is lying on the floor or on the beach, and which provides a writing area and/or book support.

It is still another object of this invention to provide a portable desk which comprises a member having a substantially flat surface, a bracket having supporting means adjacent its ends, each of said supporting means being adapted for removably attaching the bracket to an automobile steering wheel or the like, or for supporting a book or the like, and means on said bracket intermediate its ends for pivotally attaching the bracket to the substantially flat member.

Other objects and advantages of the invention will become apparent from the following description taken together with the accompanying drawings.

Of the drawings:

FIGURE 1 is a perspective view showing the portable desk in place on a steering wheel with a book supported thereon;

FIGURE 2 is a perspective view showing the portable desk in an inverted position with the bracket rotated 180° for supporting a book in an open position on another substantially flat surface;

FIGURE 3 is a perspective view showing the portable desk disposed as in FIGURE 1 for use in supporting a book and also for providing a writing surface;

FIGURE 4 is a perspective view of the portable desk with the supporting bracket rotated 180° providing an easel hooked to a steering wheel or the like;

FIGURE 5 is a perspective view showing the portable desk attached to the lower portion of a steering wheel to provide a table or the like; and FIGURE 6 is an enlarged vertical sectional view of the supporting bracket.

Referring now to the drawings, FIGURE 1 shows a steering wheel 10 of the type commonly used in cars, buses, boats and the like, having a horn rim 10a and spokes 10b. Attached to the steering wheel is a portable desk 11 which is designed to provide both a writing drawing surface and a book holder. The portable desk 11 includes a member 12 which acts as a desk or a tray and has a substantially flat surface. A pair of rubber bands 13 are provided on the desk located adjacent to a side 12a and to a top edge 12b. The rubber bands 13 are provided to hold writing paper, drawing paper or the like, on the flat surface when the desk member 12 is arranged in the substantially vertical position as that shown in FIGURE 1. Adjacent the upper edge of the member 12 is a pair of spaced apertures 14.

A supporting bracket 15 is provided in connection with the portable desk. The bracket 15 is normally constructed of a wire material and is arranged to provide two parallel rod-like portions 16 defining the side limits of the bracket. The terminal ends of the wire rods are turned as at 17 to provide an upper hook portion 17a and at 18 to provide a lower hook portion 18a. It will be noted that the lower hook portion has a squared turn so that it provides a hook which is somewhat more adaptable to supporting a book (shown in dotted lines) than the upper hooked portion 17a, which is more rounded and adapted to be fitted over a steering wheel or the like. A brace 19 is also provided intermediate the hook portions between the rods 16 to strengthen the bracket.

Also intermediate the hook portions are a pair of loops 20 in the rod 16 which are made by bending the rods back upon themselves. The loops 20 are designed to pass through the apertures 14 in the member 12. This allows the bracket 15 to be pivoted about the loops 20 so that it may rest on either side of the member 12.

As can be seen in FIGURE 1, the portable desk 11 is hooked over a steering wheel by means of the upper hook-shaped portion 17a and a book 21 (shown in dotted lines) is supported in the lower hook portion 18a. This provides support for the book 21 and also leaves a writing surface on the member 12 which can be used by the operator of an automobile, for example. The rubber bands 13 are designed to hold writing paper or drawing paper or the like, on the surface 12 while the member is in the substantially vertical position shown.

In FIGURE 2, the portable desk 11 is shown in use on an uneven surface such as the beach, a park bench or the car seat. In this position, the bracket 15 is rotated 180° so that the upper hook portion 17a rests against the back side 12c of the member 12. This allows a book 21 (shown in dotted lines) to be inserted in the lower hook-shaped portion 18a so that it is disposed in a slightly elevated position to facilitate reading.

In FIGURE 3, the portable desk is again shown in use on a rough surface such as a beach or a car seat. In this case, however, the bracket is located in substantially the same position as that shown in FIGURE 1 so that the writing area 12 is available to the user. A book 21 (shown in dotted lines) is fitted in the lower hook-shaped portion 18a and is disposed at a slightly elevated position due to the presence of the hook-shaped portion 17a which abuts the beach or car seat.

In FIGURE 4, the portable desk 11 is shown in use as a writing surface, an easel or a drawing board. In this position, the bracket 15 has again been rotated 180° so that the lower hook-shaped portion 18a can be hooked over the steering wheel. This allows the entire surface 12 to be used for a writing surface. The rubber bands are used to hold the writing or drawing material on the surface 12.

In FIGURE 5, the portable desk is shown in use as a sandwich tray or the like. In this case, the desk is turned 180° and the upper hook-shaped portion 17a is hooked over the bottom portion of the steering wheel 10, so that the back side 12c of the desk member 12 may be used as a tray.

As can be seen quite clearly in FIGURE 6, the upper hook-shaped portion 17a and the lower hook-shaped portion 18a are disposed so that their mouths open in opposite directions. This is helpful since in some cases it is desirable to have the upper hook-shaped portion act as an elevating means for the book which is supported in the lower portion 18a.

Having thus described my invention as related to the embodiments shown in the accompanying drawings, it is my intention that the invention be not limited by any of the details of description unless otherwise specified, but rather be construed broadly within its spirit and scope as set out in the accompanying claims.

I claim:

1. A device of the character described, comprising: a member having a substantially flat surface and a pair of spaced apertures adjacent an edge thereof, a bracket including a pair of spaced substantially parallel rods, the ends of said rods being turned up to define hook portions adapted for removably attaching said bracket to an object such as an automobile steering wheel, or for supporting an object such as a book, and loops in said rods intermediate the ends thereof, said loops passing through said apertures to effect a pivotal attachment between said bracket and said member.

2. The device of claim 1 wherein said member includes means for holding writing paper or the like, on the surface thereof.

3. The device of claim 1 wherein the mouths of said hook portions open in opposite directions.

References Cited in the file of this patent

UNITED STATES PATENTS

| | | |
|---|---|---|
| 530,349 | Payne | Dec. 4, 1894 |
| 885,958 | Robinson | Apr. 28, 1908 |
| 1,191,425 | Huddle | July 18, 1916 |
| 1,402,483 | Evans | Jan. 3, 1922 |
| 1,964,339 | Brassell | June 26, 1934 |
| 2,791,446 | Hilsinger | May 7, 1957 |
| 2,932,544 | Lambert | Apr. 12, 1960 |